United States Patent
Dzung et al.

(10) Patent No.: US 9,769,728 B2
(45) Date of Patent: Sep. 19, 2017

(54) LINK SELECTION IN LOSSY COMMUNICATION NETWORKS

(71) Applicant: ABB RESEARCH LTD, Zürich (CH)

(72) Inventors: Dacfey Dzung, Wettingen (CH); Yvonne-Anne Pignolet, Zürich (CH)

(73) Assignee: ABB Research Ltd., Zurich (CH)

( * ) Notice: Subject to any disclaimer, the term of this patent is extended or adjusted under 35 U.S.C. 154(b) by 170 days.

(21) Appl. No.: 14/633,619

(22) Filed: Feb. 27, 2015

(65) Prior Publication Data

US 2015/0172992 A1 Jun. 18, 2015

Related U.S. Application Data

(63) Continuation of application No. PCT/EP2013/067392, filed on Aug. 21, 2013.

(30) Foreign Application Priority Data

Aug. 31, 2012 (EP) ..................... 12182589

(51) Int. Cl.
 *H04L 12/707* (2013.01)
 *H04W 40/12* (2009.01)
 *H04W 76/02* (2009.01)
 *H04L 12/721* (2013.01)

(52) U.S. Cl.
 CPC ............. *H04W 40/12* (2013.01); *H04L 45/22* (2013.01); *H04W 76/02* (2013.01); *H04L 45/124* (2013.01); *Y02B 60/50* (2013.01)

(58) Field of Classification Search
 CPC ....... H04L 45/124; H04L 45/22; H04W 40/12
 See application file for complete search history.

(56) References Cited

U.S. PATENT DOCUMENTS

| | | | |
|---|---|---|---|
| 6,999,417 B1 * | 2/2006 | Graham | H04L 45/12 370/230 |
| 2002/0054578 A1 * | 5/2002 | Zhang | H04L 1/0001 370/328 |
| 2004/0044765 A1 * | 3/2004 | Meek | H04L 45/00 709/224 |

(Continued)

OTHER PUBLICATIONS

European Search Report mailed on Feb. 4, 2013 for European Application No. 12182589.7.

(Continued)

*Primary Examiner* — Benjamin Lamont
(74) *Attorney, Agent, or Firm* — Taft Stettinius & Hollister LLP

(57) ABSTRACT

The present disclosure encompasses establishing and maintaining a routing protocol based on a measured link metric p, such as for a smart grid communication system. A link between a first node such as a router A and a neighbouring second node B of a communication path from a source to a destination in a packet oriented communication network is selected wherein the two nodes are connected via first and second communication links. An updated link metric p(t+1) at a point in time t+1 of the first communication link is determined. The first or the second communication link is selected for transmitting a further packet from node A to node B by comparing the updated link metric p(t+1) to a threshold $p_{thr}$.

2 Claims, 4 Drawing Sheets

(56) References Cited

U.S. PATENT DOCUMENTS

| | | | | |
|---|---|---|---|---|
| 2005/0111487 A1* | 5/2005 | Matta | ............... | H04L 12/2602 |
| | | | | 370/468 |
| 2006/0072600 A1* | 4/2006 | Graham | ............... | H04L 45/12 |
| | | | | 370/412 |
| 2008/0025216 A1* | 1/2008 | Singh | ............... | H04L 47/10 |
| | | | | 370/231 |
| 2009/0167291 A1* | 7/2009 | Richeson | ............... | G01D 4/004 |
| | | | | 324/107 |
| 2009/0185496 A1* | 7/2009 | Doverspike | ............ | H04L 43/02 |
| | | | | 370/245 |
| 2013/0117420 A1* | 5/2013 | Han | ............... | H04L 45/00 |
| | | | | 709/220 |

OTHER PUBLICATIONS

Tian Hui et al., Adaptive routing considering the state of receiver for Ad Hoc Networks, Electronics, Circuits and Systems, $12^{th}$ IEEE International Conference, Piscataway NJ USA, Dec. 11, 2005, pp. 1-4.

Wang H. S. et al., Finite State Markov Channel—A useful Model for Radio Communication Channels, IEEE Transactions on Vehicular Technology, IEEE Service Center, Piscataway NJ USA, vol. 44 No. 1, Feb. 1, 1995, pp. 163-171.

Notification Concerning Transmittal of Copy of International Preliminary Report on Patentability (Forms PCT/IB/326 and PCT/IB/373) and the Written Opinion of the International Searching Authority (Form PCT/ISA/237) issued on Mar. 12, 2015, by the International Bureau of WIPO in corresponding International Application No. PCT/EP2013/067392. (8 pages).

* cited by examiner

LINK SELECTION IN LOSSY COMMUNICATION NETWORKS

FIELD OF THE INVENTION

The invention relates to the field of establishing and maintaining a communication route based on a measured link metric, in particular for a communication network for a smart grid. Specifically, the present invention relates to a method of and a system for selecting a link between two nodes.

BACKGROUND OF THE INVENTION

The process of selecting a path in a network along which to send network traffic is generally referred to as routing. The overall traffic performance of the network depends heavily on the selected path. In packet communication networks, routing directs packet from their source to their ultimate destination through intermediate nodes. These nodes are typically hardware devices such as routers, bridges, gateways, etc.

The path to be selected comprises several links between nodes of the network. The link through which to send traffic is chosen according to a metric. Thus, for network performance the chosen metric is of great importance.

In the art several link metrics to be used for link selection are known, e.g. an Expected Transmission Count ETX derived from a measured packet delivery ratio of a link and assuming that an acknowledgment for each transmitted packet is received in order to confirm its delivery. Additionally, link metric measurements are updated by simple averaging, e.g. using an ad-hoc first order smoothing filters. The routing process then uses the latest available link metric measurement. This approach does not take into account any known variation of a link transmission rate or transmission success rate and, thus, fails to deliver routing performance needed in state of the art smart grid communication networks with time-varying links.

However, stochastic learning is known in the art for routing time-varying links. This approach provides a simple linear reward-penalty learning algorithm which updates the probability of choosing a link depending on acknowledgments received. However, a reaction speed and a minimal probability for each link are the only parameters of this scheme and do not provide sufficient variability for state of the art smart grid systems.

In addition, for some applications, several link layer technologies may be deployed in a given network, i.e. there may be a copper, fiber-optic, wireless and a powerline link between nodes of the network. This plurality of link layer technologies is not taken into account by any routing protocol known in the art.

The paper by Tian Hui et al. entitled "Adaptive routing considering the state of receiver for Ad Hoc Networks" (12TH IEEE INTERNATIONAL CONFERENCE ON ELECTRONICS, CIRCUITS AND SYSTEMS, ICECS 2005) is concerned with adaptive routing in Mobile Ad Hoc Networks with mobile wireless nodes. The paper proposes a channel adaptive shortest routing that takes into account a packet queuing delay at the nodes. All communication links between any two neighboring nodes are wireless and modeled as Markov Channels with eight states when evaluating the proposed routing algorithm.

DESCRIPTION OF THE INVENTION

It is therefore an objective of the invention to increase reliability of link selection for routing along lossy and time-variant links, in particular for a smart grid system. This objective is achieved by a method of selecting an inter-node link between a first node and a second node of a communication path and by a node for a packet oriented communication network according to the independent claims. Preferred embodiments are evident from the dependent patent claims, wherein the claim dependency shall not be construed as excluding further meaningful claim combinations.

According to the invention, a communication link between a first node such as a router A and a specific neighbouring second node B of a communication path from a source to a destination in a packet oriented communication network is selected as follows. The two nodes are connected via a first communication link that has stochastic or time variable properties due to the lossy underlying communication technology, e.g. wireless technology experiencing frequent short outages due to shadowing or interference. These stochastic and time variable properties may further be modelled as a Finite State Markov Channel FSMC with two states such as "good" and "bad". A two state FSMC is also known in the art as Gilbert-Elliott GE channel, however, in principle a FSMC may be modelled with multiple states.

The first and second nodes are further connected via a second communication link. The second link may or may not be modelled as a FSMC, however, either link may be a power or distribution line communication PLC/DLC, wireless, copper, or fiber-optic link. The selection of the communication link includes identifying the corresponding device ports or physical media interfaces of the two nodes. The latter are distinct even for a same link layer technology, implying, for both node A and node B, two antennas in case of two wireless communication links, or two powerline couplers in case of two powerline communication links.

In addition, the method according to the invention is unidirectional, i.e. the reverse direction BA is independent of the original AB. By choosing a link for a given direction, no presupposition is made for the reverse direction.

According to the invention, after each transmission an acknowledgment is to be received. The acknowledgement contains information on transmission success, e.g. for successful transmission a message "ack", for unsuccessful transmission a message "nak". If no transmission has occurred on a given link, the received information on transmission success is "none". To initialize, an acknowledgment is received for a first packet from node A to node B over the first or second link.

In a next step an updated link metric p(t+1) of the first communication link at a time t+1 is determined. The link metric is indicative of a state or condition of the first communication link, i.e. the probability that the respective link is in a state. This link metric may also be referred to as belief or information state in the theory of Partially Observable Markov Decision Processes (POMDP). The metric, used according to the invention, is based on state transition probabilities $\lambda_1$ and $\lambda_2$ of the first and second state of the FSMC respectively.

Depending on the acknowledgement or observation of the packet transmitted earlier the link metric at time p(t+1) may be updated. For a successful transmission, i.e. an observation "ack", the metric update may be according to the following equation $$p(t+1) = \frac{\lambda_1 p_G p(t) + \lambda_2 p_B (1 - p(t))}{p_G p(t) + p_B (1 - p(t))}.$$

For an unsuccessful transmission, i.e. an observation "nak", the metric may be updated according to the following equation $$p(t+1) = \frac{\lambda_1(1-p_G)p(t) + \lambda_2(1-p_B)(1-p(t))}{(1-p_G)p(t)+(1-p_B)(1-p(t))}.$$

In addition, the metric depends on a packet transmission success probability, $p_G$ and $p_B$ for two states "good" and "bad" of the FSMC link respectively. In the "good" and "bad" state a packet may be successfully transmitted eventually, however, the terms "good" and "bad" refer to the transmission success probability of the "good" state $p_G$ being greater than of the "bad" state, i.e. a packet is more likely to be successfully transmitted in the "good" state than the "bad" state of the link.

If no packet transmission was selected for a given link, no observation is received, and its metric is updated according to the following equation $$p(t+1) = \lambda_1 p(t) + \lambda_0 (1-p(t))$$

Furthermore, according to the invention a previous link metric value p(t) at a point in time t and the latest packet transmission observation, e.g. a information "ack", "nak" or "none" is needed.

Finally, the first or the second communication link is selected for transmitting a next or second packet from node A to node B by comparing the updated link metric p(t+1) to a threshold $p_{thr}$. The threshold $p_{thr}$ depends on the FSMC parameters and may in theory take any value between 0 and 1, yet $p_{thr}$ between 0.2 and 0.7 is expected in most cases. The threshold $p_{thr}$ can be calculated numerically according to POMDP theory using FSMC parameters which in turn may be based on earlier observations of the link and its behavior. For a link with a high probability to be in its bad state a higher threshold is to be chosen and vice versa. In case both links are modeled as a FSMC, two dimensional thresholds may be provided.

In a preferred variant of the invention, the first link is selected, wherein the link metric is indicative of the first communication link being in a "good" state, if the updated link metric p(t+1) exceeds the threshold $p_{thr}$. In the respective alternative case, the second link is selected, wherein the link metric being indicative of the first communication link being in a "bad" state, if the updated link metric p(t+1) is below the threshold $p_{thr}$.

In an embodiment of the invention, the second communication link is a single state link, e.g. a wireless connection with a single packet transmission success probability $p_W$, where $p_G$ of the first link is greater than $p_W$ and $p_W$ is greater than $p_B$ of the first link, which is e.g. a PLC link. In case said condition $p_B < p_W < p_G$ is not satisfied, the wireless link would be either always better or worse than the alternative PLC link. Thus, the non-stochastic link would be chosen either permanently or never, making use of the current invention obsolete.

In a further advantageous embodiment of the invention, both communication links are PLC links coupling to opposite sides of a switching device, i.e. a circuit breaker in a PLC ring. In this variant, the link metric p is a vector with two components $p_1$, $p_2$ indicative of the state of the two PLC links, respectively. According to the invention, the first PLC link is selected if the corresponding first component of the updated link metric $p_1(t+1)$ exceeds a threshold $p_{thr}$ depending on the second component $p_2(t+1)$.

The present invention also relates to a node A for a packet oriented communication network, adapted to be connected to a node B of the network via a first communication link and via a second communication link, comprising an observer module for establishing a packet transmission observation for a packet being transmitted from node A to node B, an update module for determining an updated link metric p(t+1) of the first communication link, based on state transition probabilities for a Finite State Markov Channel FSMC with two states modeling the first link, packet transmission probabilities for the two FSMC states, a previous link metric p(t) and the latest packet transmission observation, a select module for selecting the first communication link or the second communication link for transmitting a next packet from node A to node B by comparing the updated link metric p(t+1) to a threshold $p_{thr}$.

The present invention further relates to a use of the method in a smart grid communication system for communicating electric power distribution grid data from sensor or source nodes and to actuator or destination nodes of the communication system. A "Smart Grid" or "Distribution Automation" communication may include applications that consist of a city-wide network of smart meters and distribution monitoring sensors. Smart meters in an urban "smart grid" application will include electric, gas, and/or water meters typically administered by one or multiple utility companies. These meters will be capable of advanced sensing functionalities such as measuring the quality of electrical service provided to a customer, providing granular interval data, or automating the detection of alarm conditions. In addition, they may be capable of advanced interactive functionalities, which may invoke an actuator component, such as remote service disconnect or remote demand reset. More advanced scenarios include demand response systems for managing peak load, and distribution automation systems to monitor the infrastructure that delivers energy.

In another embodiment, at least one of the two communication links is not a wireless link, and the two nodes are immobile, or stationary. This avoids the challenges related to the dynamic nature of the network topology and the resource constraints in networks with mobile wireless nodes.

Further details will be available in a publication by Dacfey Dzung and Yvonne-Anne Pignolet entitled "Dynamic Selection of Wireless/Powerline Links using Markov Decision Processes", and submitted to IEEE International Conference on Smart Grid Communications (SmartGridComm), Vancouver, Canada, 21-24 October 2013.

The advantage of the current invention is using a model based only on a few basic parameters of the underlying technology of a link as an input for future decisions on where to send the next packet, thus enabling a quick and efficient link selection process.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of designations. In principle, identical parts are provided with the same reference symbols in the figures.

DETAILED DESCRIPTION OF PREFERRED EMBODIMENTS

Figure 1:
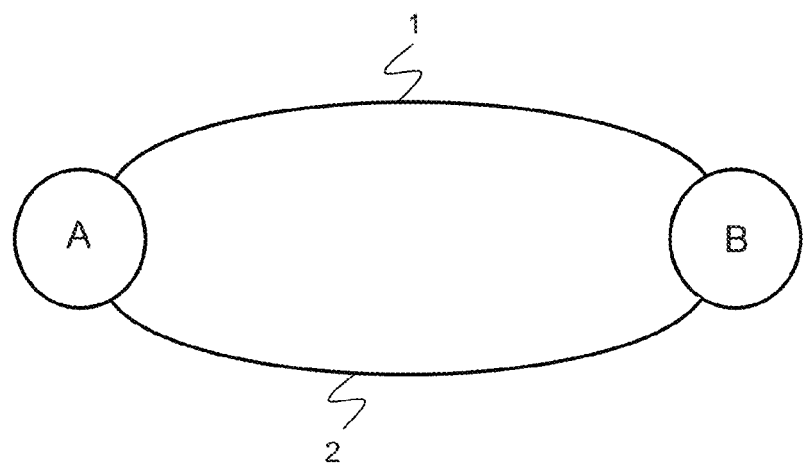
FIG. 1 shows a schematic of nodes A and B connected via two links.

FIG. 1 shows a first link 1 and a second link 2 linking a first node A and a second node B of a communication path from a source to a destination in a packet oriented communication network. The node A may be a router and the node B may be a neighbouring node. At least the first link 1 may have stochastic or time variable properties, thus modelled as a Finite State Markov Channel FSMC with two states, good and bad. Both links may be one of a power line or distribution line communication, PLC or DLC respectively, wireless, copper, or fiber-optic link.

Figure 2:
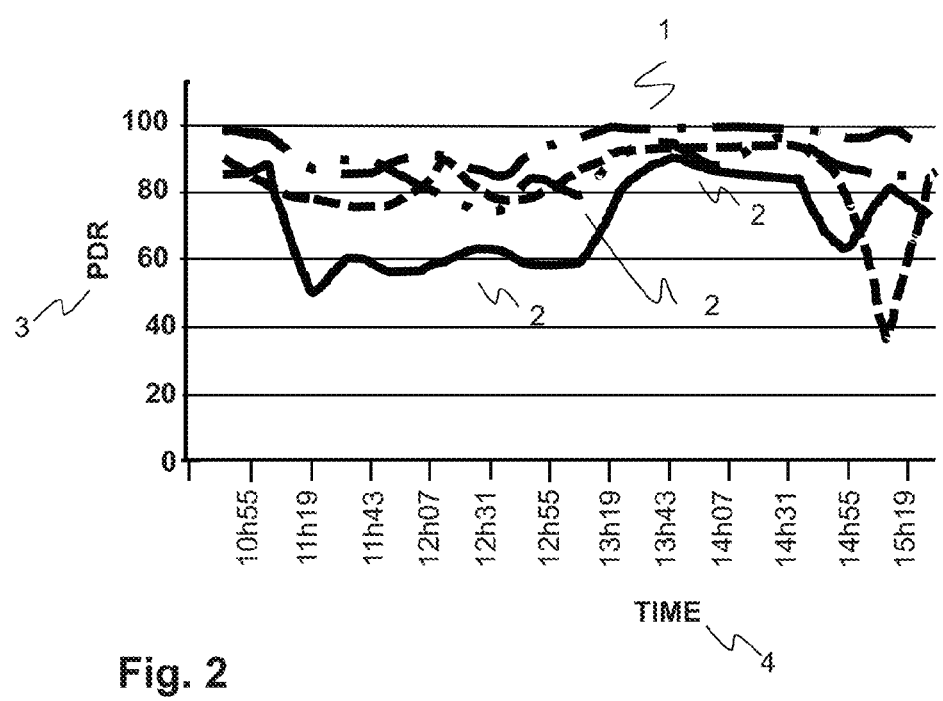
FIG. 2 shows a plot of a packet transmission success rate versus time for low-rate low-power powerline communication links.

FIG. 2 shows for several links 1, 2 a plot of a packet transmission success rate 3 (packet delivery rate PDR) during a time of day 4. A high value represents a higher success rate, where 100 refers to ideal transmission, and a lower value represents a lower success rate, where a vanishing value refers to no transmission at all. The packet transmission rate 3 may vary drastically for different available links 1, 2. The variation may have different causes depending on the type of underlying link technology, e.g. for a wireless link shadowing may lead to an unsuccessful transmission. Time varying behaviour in wireless links occur due to occasional shadowing, however, these effects are typically measured in seconds or minutes, i.e. much faster than the time constants of PLC links.

However, the plotted links 1, 2 are power transmission line links. PLC links 1, 2 are mainly affected by relatively slow processes such as switching of the power grid and activation of electrical equipment. Thus, state transitions typically occur only every few hours.

For different technology the transmission success rate 3 may be different as a function of time or may vary more dramatically, e.g. for a wireless link in the case of loss of a direct line of sight the transmission success rate may vanish. However, the transmission success rate may be used to determine an updated link metric and to select a link 1, 2.

Figure 3:
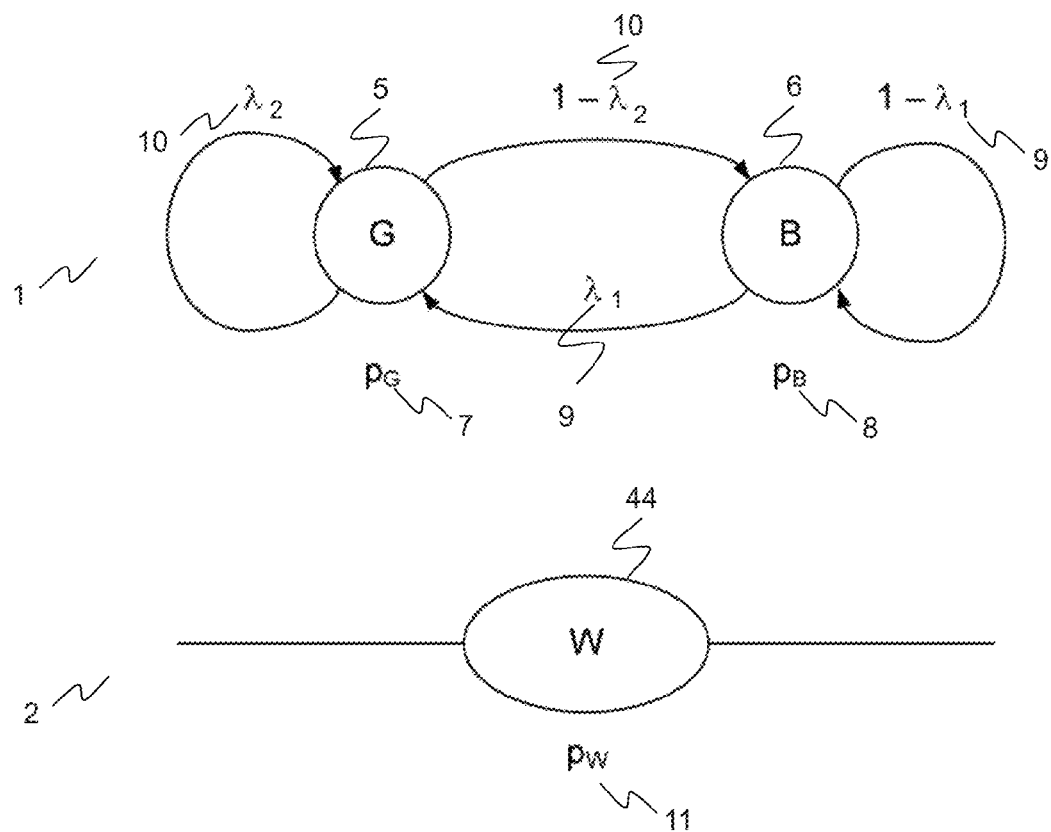
FIG. 3 schematically shows a Gilbert-Elliott Markov model for a powerline link, and a single-state model for a wireless link.

FIG. 3 schematically shows a special case of a Finite State Markov Channel FSMC in a Gilbert-Elliott GE model for a powerline link 1, and a single-state model for a wireless link 1. The powerline link 1 is modelled as a GE channel with two states 'good' 5 and 'bad' 6, with packet transmission success probability $p_G$ 7 and $p_B$ 8, respectively. Where good and bad refers to $p_G$ 7 being greater than $p_B$ 8. The metric is further based on state transition probabilities $\lambda_1$ 9 and $\lambda_2$ 10 of the good 5 and bad 6 state of the GE model respectively. The wireless link 'WL' 2 is modelled simply by its constant average packet transmission success probability $p_W$ 11. This is justified by the fact that typical wireless links in a Smart Grid application are fixed installations and operate in a steady state.

In principle, a transmitter selects on which link to transmit a packet, based on its current information, as represented by the metric or so-called belief state, i.e. the probability of the powerline channel being in a the good state. Assuming that $p_B < p_W < p_G$, the transmitter selects the PLC link 1 if the PLC link 1 is believed to be in the 'good' state 5, since it has a higher success probability 10 than the wireless link, $p_W < p_G$, and selects the wireless link 2 otherwise.

However, at time a t of the transmission, the transmitter does not know the current state of the links 1, 2, but must predict it based on earlier observations. These observations are the confirmations or acknowledgments obtained by the underlying transmission protocol whether a packet transmission has succeeded earlier. The protocol specifies how the transmitter updates the link information, given these partial observations of the Markov states 5, 6, and how to use it in a threshold policy.

Figure 4:
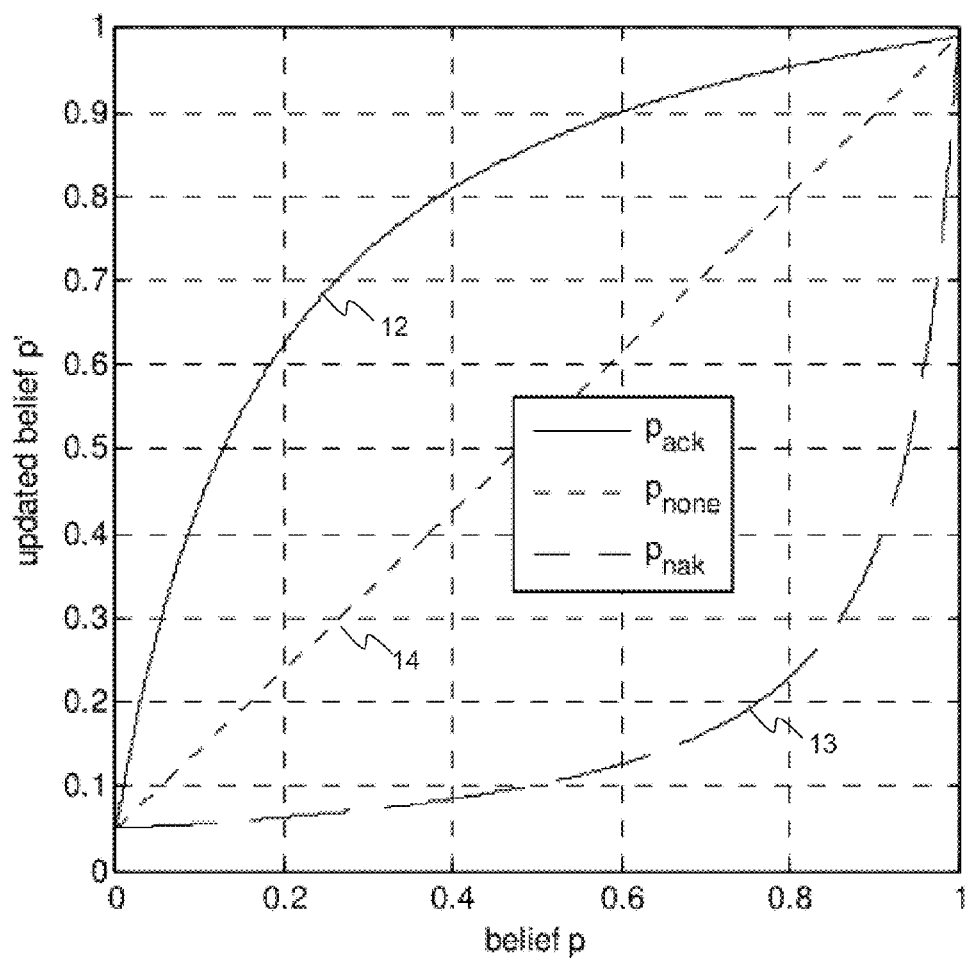
FIG. 4 shows a plot of a metric p=p(t) against an updated metric p'=p(t+1) for a selection of parameters.

FIG. 4 shows a plot of a metric p=p(t) against an updated metric p'=p(t+1) for a selection of parameters, with parameters $\lambda_1$=0.05, $\lambda_2$=0.99, $p_G$=0.95, $p_B$=0.15. Depending on the acknowledgement or observation of the packet transmitted earlier the link metric or belief at time t+1, p(t+1) may be updated. For a successful transmission, i.e. an observation "ack", the metric update may be according to the following equation $$p'(t+1) = \frac{\lambda_1 p_G p(t) + \lambda_2 p_B(1-p(t))}{p_G p(t) + p_B(1-p(t))}.$$

For an unsuccessful observation, i.e. an observation "nak", the metric or belief p may be updated according to the following equation $$p'(t+1) = \frac{\lambda_1(1-p_G)p(t) + \lambda_2(1-p_B)(1-p(t))}{(1-p_G)p(t) + (1-p_B)(1-p(t))}.$$

Thus, the metric follows the trend $p_{ack}$ 12 for a successful earlier transmission, i.e. an observation "ack". The belief increases rapidly from a low value, e.g. subsequent successful transmission leads to the belief that the link 1 is in a good state 5.

The metric follows the trend $p_{nak}$ 13 for an unsuccessful earlier transmission, i.e. an observation "nak". The belief decreases rapidly from a high value, e.g. subsequent transmission failure leads to the belief that the link is in a bad state 6.

In case no information on an earlier transmission on link 1 is available, i.e. the transmission occurred through link 2, the metric follows the trend $p_{none}$ 14.

$$p(t+1) = \lambda_1 p(t) + \lambda_0 (1-p(t))$$

Thus the belief on the current state 5, 6 is propagated only according to FSMC parameters, until further information on the link 1 is available.

Figure 5:
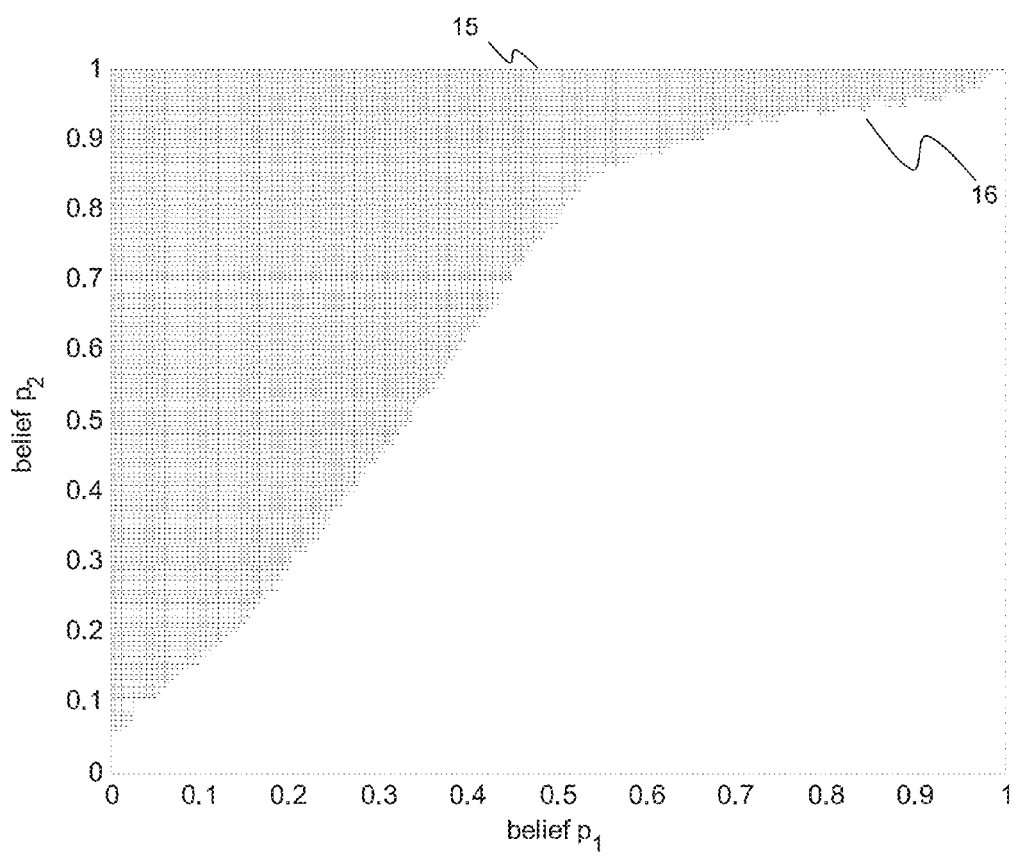
FIG. 5 shows a decision region for a vector metric.

FIG. 5 shows a decision region 15, 16 for a vector metric consisting of metrics $p_1$ and $p_2$. A vector metric is used in case multiple links 1, 2 are modelled as an FSMC, thus two metrics $p_1$ and $p_2$ are to be considered. The decision region 15, 16 then allows making a selection on which link to choose for transmitting a next packet.

The plot shown in FIG. 5 depicts the case of two FSMC links 1, 2. The plot is divided into two decision regions 15, 16. The area in which the vector metric ($p_1$, $p_2$) lies specifies the optimum action to be taken by the transmitter. The calculations involved are more complex in the multiple FSMC case. However, this can be pre-calculated for a given set of GE model parameters.

LIST OF DESIGNATIONS

1, 2 Link
3 Transmission success rate
4 Time
5 Good state
6 Bad state
7 Transmission success probability $p_G$
8 Transmission success probability $p_B$
9 State transition probability $\lambda_1$
10 State transition probability $\lambda_2$
11 Transmission success probability $p_W$
12 Trend $p_{ack}$
13 Trend $p_{nak}$
14 Trend $p_{none}$
15, 16 Decision region

The invention claimed is:

1. A method of selecting a link between a first node A and a second node B of a communication path in a packet oriented communication network, wherein the two nodes A, B are connected via a first communication link and a second communication link, the two communication links are both modelled as Finite State Markov Channels (FSMCs) with two states, the method comprising:
   establishing a packet transmission observation for a packet being transmitted from node A to node B;
   determining an updated link metric p(t+1) of the first communication link, based on state transition probabilities and packet transmission success probabilities for the two FSMC states, a previous link metric p(t) and the latest packet transmission observation, wherein the link metric p(t) is a vector with a first component $p_1$ and a second component $p_2$ indicative of a condition of the two communication links, respectively;
   selecting the first or the second communication link for transmitting a next packet from node A to node B by comparing the updated link metric p(t+1) to a threshold $p_{thr}$; and
   selecting the first communication link if the first component of the updated link metric $p_1(t+1)$ exceeds a threshold $p_{thr}$ depending on the second component $P_2(t+1)$, and selecting the second communication link if $p_1(t+1)$ is below the threshold $p_{thr}$ depending on the second component $p_2(t+1)$.

2. The method of claim 1, further comprising:
   determining an updated link metric p(t+1) of the second communication link, based on the state transition probabilities and the packet transmission success probabilities for the two FSMC states, the previous link metric p(t) and the latest packet transmission observation.

* * * * *